United States Patent
Saari et al.

(10) Patent No.: US 7,876,016 B2
(45) Date of Patent: Jan. 25, 2011

(54) STATOR WINDING METHOD AND APPARATUS

(75) Inventors: Juha Saari, Espoo (FI); Erkki Lantto, Helsinki (FI); Marko Palko, Espoo (FI)

(73) Assignee: Sundyne Corporation, Arvada, CO (US)

( * ) Notice: Subject to any disclaimer, the term of this patent is extended or adjusted under 35 U.S.C. 154(b) by 280 days.

(21) Appl. No.: 12/205,141

(22) Filed: Sep. 5, 2008

(65) Prior Publication Data

US 2009/0127966 A1      May 21, 2009

Related U.S. Application Data

(60) Provisional application No. 60/988,282, filed on Nov. 15, 2007.

(51) Int. Cl.
*H02K 3/14* (2006.01)
*H02K 3/20* (2006.01)

(52) U.S. Cl. .................. 310/213; 310/179; 310/180; 310/215

(58) Field of Classification Search ........... 310/179, 310/180, 213, 215; *H02K 3/14, 3/20*
See application file for complete search history.

(56) References Cited

U.S. PATENT DOCUMENTS

| | | | | | |
|---|---|---|---|---|---|
| 587,764 | A | * | 8/1897 | Short | 174/129 R |
| 1,144,252 | A | * | 6/1915 | Roebel | 310/213 |
| 2,821,641 | A | | 1/1958 | Ringland | |
| 2,856,547 | A | * | 10/1958 | Saums | 310/45 |
| 3,014,139 | A | | 12/1961 | Shildneck | |
| 3,038,093 | A | * | 6/1962 | Needham et al. | 310/179 |
| 3,735,169 | A | * | 5/1973 | Balke et al. | 310/214 |
| 4,080,543 | A | * | 3/1978 | Takahashi et al. | 310/213 |
| 4,093,881 | A | * | 6/1978 | Liptak et al. | 310/214 |
| 4,128,779 | A | * | 12/1978 | Salon | 310/213 |
| 4,337,567 | A | * | 7/1982 | Lugosi et al. | 29/596 |
| 4,908,347 | A | | 3/1990 | Denk | |
| 5,994,804 | A | | 11/1999 | Grennan et al. | |
| 6,091,168 | A | | 7/2000 | Halsey et al. | |
| 6,130,496 | A | * | 10/2000 | Takigawa et al. | 310/196 |
| 6,417,592 | B2 | * | 7/2002 | Nakamura et al. | 310/184 |
| 6,483,220 | B1 | | 11/2002 | Johnsen | |
| 6,649,844 | B2 | | 11/2003 | Kusumoto et al. | |
| 6,806,611 | B2 | | 10/2004 | Bharaj et al. | |
| 7,005,772 | B1 | | 2/2006 | Frederick et al. | |
| 7,246,428 | B2 | | 7/2007 | Fukasaku et al. | |
| 7,262,537 | B2 | | 8/2007 | Worley et al. | |
| 2002/0050395 | A1 | * | 5/2002 | Kusumoto et al. | 174/128.2 |
| 2002/0167242 | A1 | * | 11/2002 | Liu et al. | 310/184 |

(Continued)

*Primary Examiner*—Quyen Leung
*Assistant Examiner*—John K Kim
(74) *Attorney, Agent, or Firm*—Carlson, Gaskey & Olds, PC

(57) ABSTRACT

A stator assembly includes a stator core and at least one conductive bundle. The stator core has a first end, a second end, and a plurality of slots extending from the first end to the second end. The conductive bundle includes a plurality of individually insulated conductive wires. At least one portion of the at least one conductive bundle extends from the first end to the second end of one slot of the plurality of slots. The at least one portion is twisted by a predetermined amount within the one slot to minimize a circulatory current along the plurality of individual insulated conductive wires in the at least one portion.

13 Claims, 6 Drawing Sheets

U.S. PATENT DOCUMENTS

2003/0071534 A1* 4/2003 Kreuzer et al. .............. 310/216
2005/0168096 A1* 8/2005 Joho .......................... 310/213
2006/0071573 A1* 4/2006 Fujita et al. ................. 310/216
2006/0148313 A1  7/2006 Lantto et al.
2009/0127966 A1* 5/2009 Saari et al. .................. 310/213

* cited by examiner

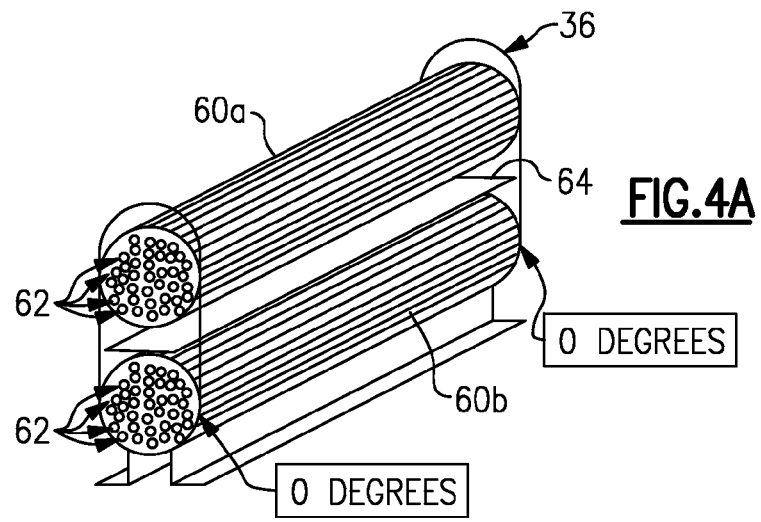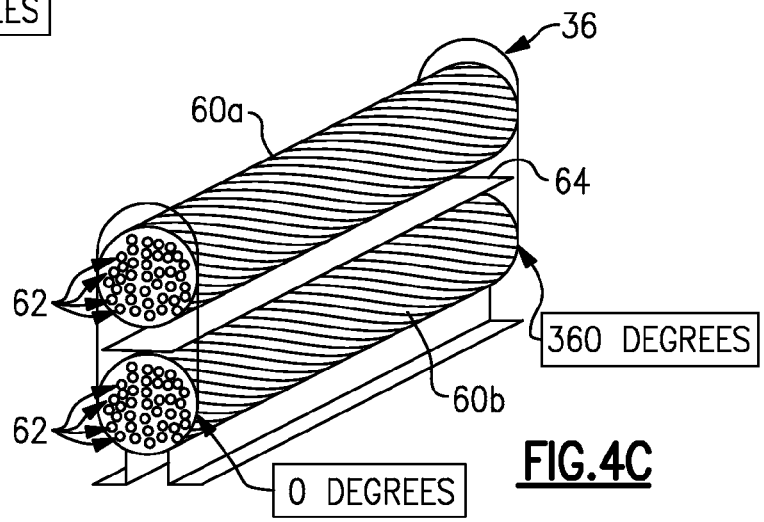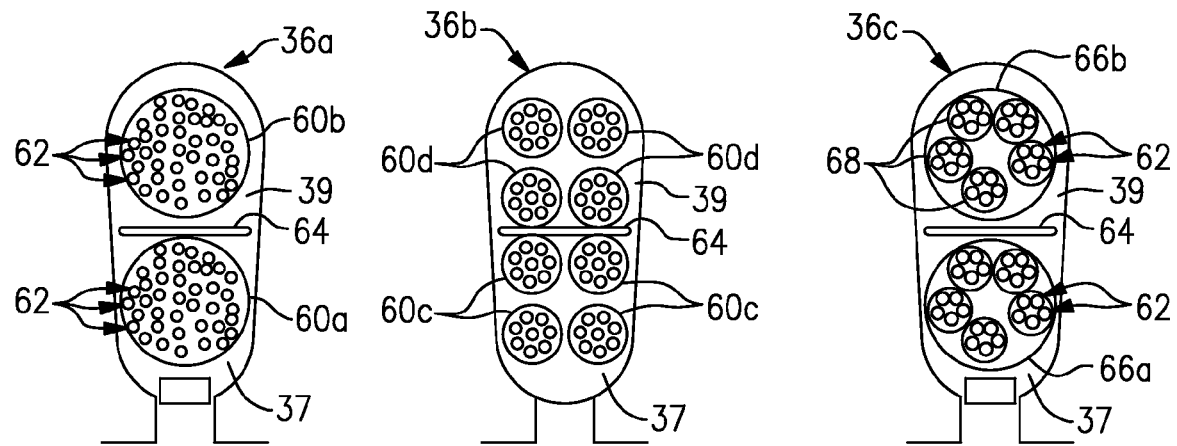

COMPARISON OF DIFFERENT WINDINGS

| STATOR NUMBER | #1 | #2 | #3 |
|---|---|---|---|
| NUMBER OF TURNS IN SLOT | 2 | 2 | 2 |
| MAGNET WIRE | STANDARD | STANDARD | LITZ |
| COIL TWISTING 360 DEGREES | YES | NO | NO |
| LOSS COEFFICIENTS<br>COIL 12 (U1-X1)<br>COIL 14 (V1-Y1)<br>COIL 16 (W1-Z1)<br>COIL 18 (U2-X2)<br>COIL 20 (V2-Y2)<br>COIL 22 (W2-Z2) | 1.098<br>1.247<br>1.323<br>1.457<br>1.364<br>1.153 | 1.275<br>1.314<br>1.523<br>2.407<br>1.518<br>1.331 | 1.20<br>3.57<br>2.62<br>2.29<br>1.67<br>2.07 |
| AVERAGE | 1.27 | 1.56 | 2.24 |

|  | 15 Hz | 50 Hz | 150 Hz | 300 Hz | 450 Hz |
|---|---|---|---|---|---|
| PHAASE U | 1.001 | 1.005 | 1.042 | 1.159 | 1.340 |
| PHASE V | 1.001 | 1.008 | 1.069 | 1.257 | 1.527 |
| PHASE W | 1.001 | 1.003 | 1.029 | 1.113 | 1.246 |
| AVERAGE FOR THE STATOR WINDING | 1.001 | 1.005 | 1.047 | 1.176 | 1.371 |

US 7,876,016 B2

STATOR WINDING METHOD AND APPARATUS

This application claims priority to U.S. Provisional Application No. 60/988,282 which was filed on Nov. 15, 2007.

BACKGROUND OF THE INVENTION

This application relates to a stator for an electric machine, and more particularly to a winding method for a stator of an electric machine.

Electric motors and generators include a rotating rotor and a stationary stator. Stators typically include a plurality of windings, and each winding may correspond to a bundle of conductive wires. Even if each wire in a bundle is insulated, the bundle may still undesirably exhibit a circulatory current among the wires of the bundle. A circulatory current is proportional to a square of an operational frequency of a motor or generator. Circulatory currents are therefore particularly problematic when a rotor of a motor or generator rotates at high speeds.

SUMMARY OF THE INVENTION

A stator assembly includes a stator core and at least one conductive bundle. The stator core has a first end, a second end, and a plurality of slots extending from the first end to the second end. The conductive bundle includes a plurality of individually insulated conductive wires. At least one portion of the at least one conductive bundle extends from the first end to the second end of one slot of the plurality of slots. The at least one portion is twisted by a predetermined amount within the one slot to minimize a circulatory current along the plurality of individual insulated conductive wires in the at least one portion.

A method of forming a stator assembly includes grouping a plurality of individual insulated conductive wires into a conductive bundle, placing a portion of the conductive bundle in a stator core slot extending from a first end of a stator core to a second end of the stator core, and twisting the bundle such that the portion is twisted by a predetermined amount within the stator core slot to minimize a circulatory current along the plurality of individual insulated conductive wires in the portion.

These and other features of the present invention can be best understood from the following specification and drawings, the following of which is a brief description.

BRIEF DESCRIPTION OF THE DRAWINGS

FIG. 4a schematically illustrates a first view of a stator core slot that includes a portion of two conductive bundles.

FIG. 4b schematically illustrates a second view of the stator core slot and portions of conductive bundles of FIG. 4a.

FIG. 4c schematically illustrates the portions of conductive bundles of FIG. 4a after being twisted by a predetermined amount.

FIG. 5a schematically illustrates a stator core slot that includes four portions of two conductive bundles.

FIG. 5b schematically illustrates a stator core slot that includes a portion of two example Litz wire conductive bundles.

DETAILED DESCRIPTION OF THE PREFERRED EMBODIMENT

Figure 1:
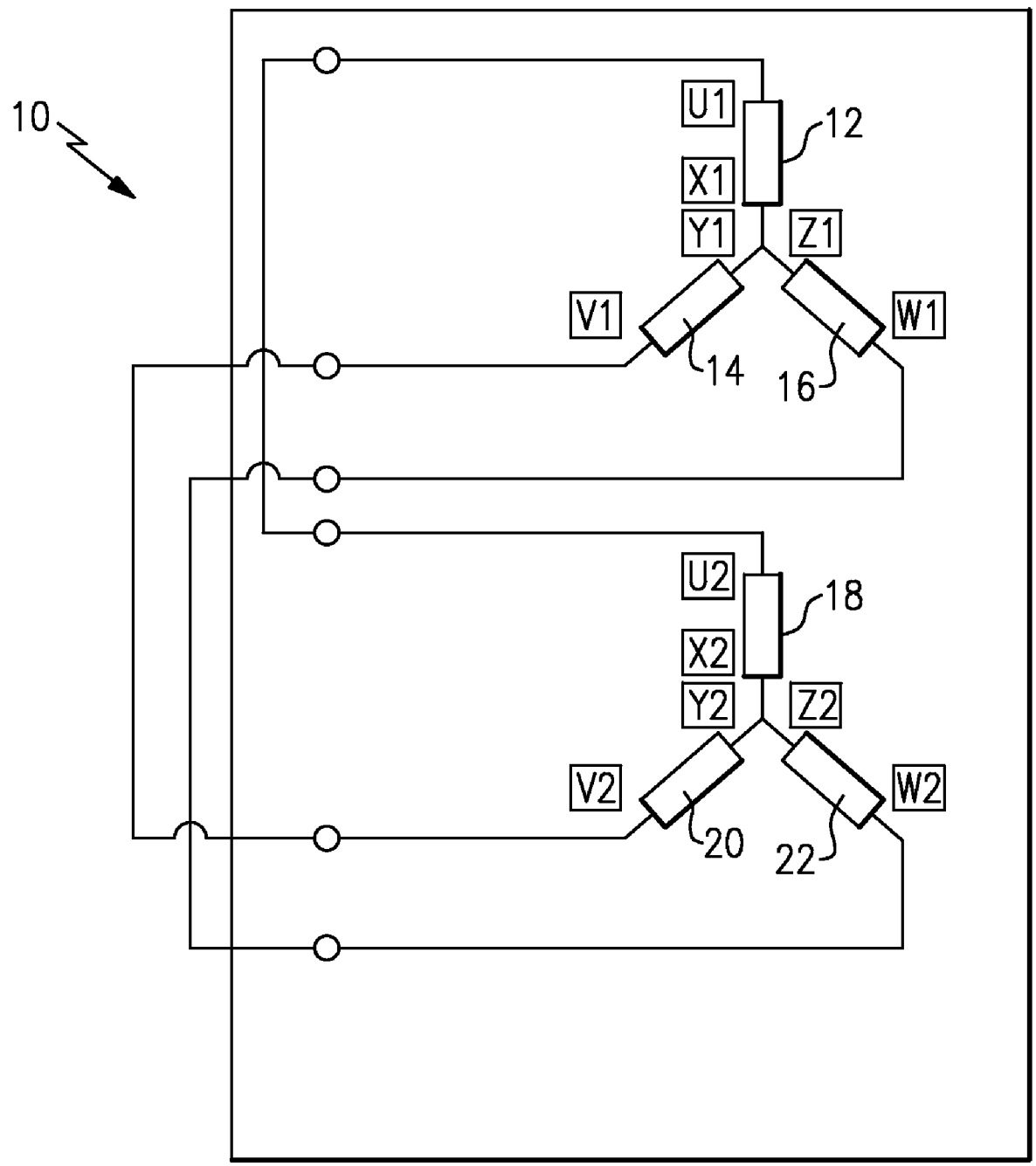
FIG. 1 schematically illustrates a stator circuit.

FIG. 1 schematically illustrates a stator circuit 10 including a plurality of coils 12, 14, 16, 18, 20, 22 in a so-called "double star" formation. Coil 12 and coil 18 are coupled in parallel as a pair, coil 14 and coil 20 are coupled in parallel as a pair, and coil 16 and coil 22 are coupled in parallel as a pair. In one example each of the pairs corresponds to a phase of alternating current ("AC") in an electrical machine.

Figure 2:
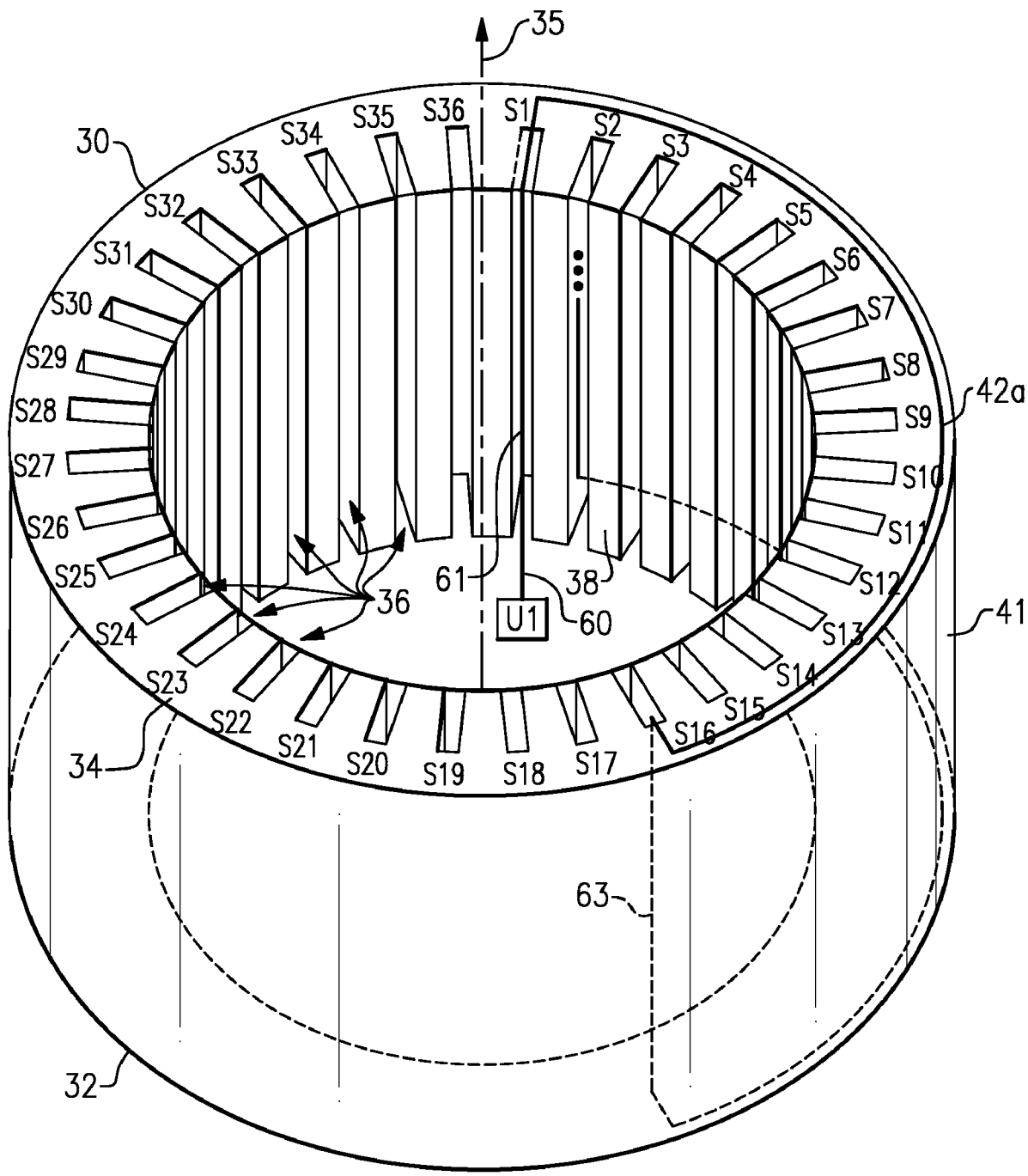
FIG. 2 schematically illustrates a stator core.
Figure 3:
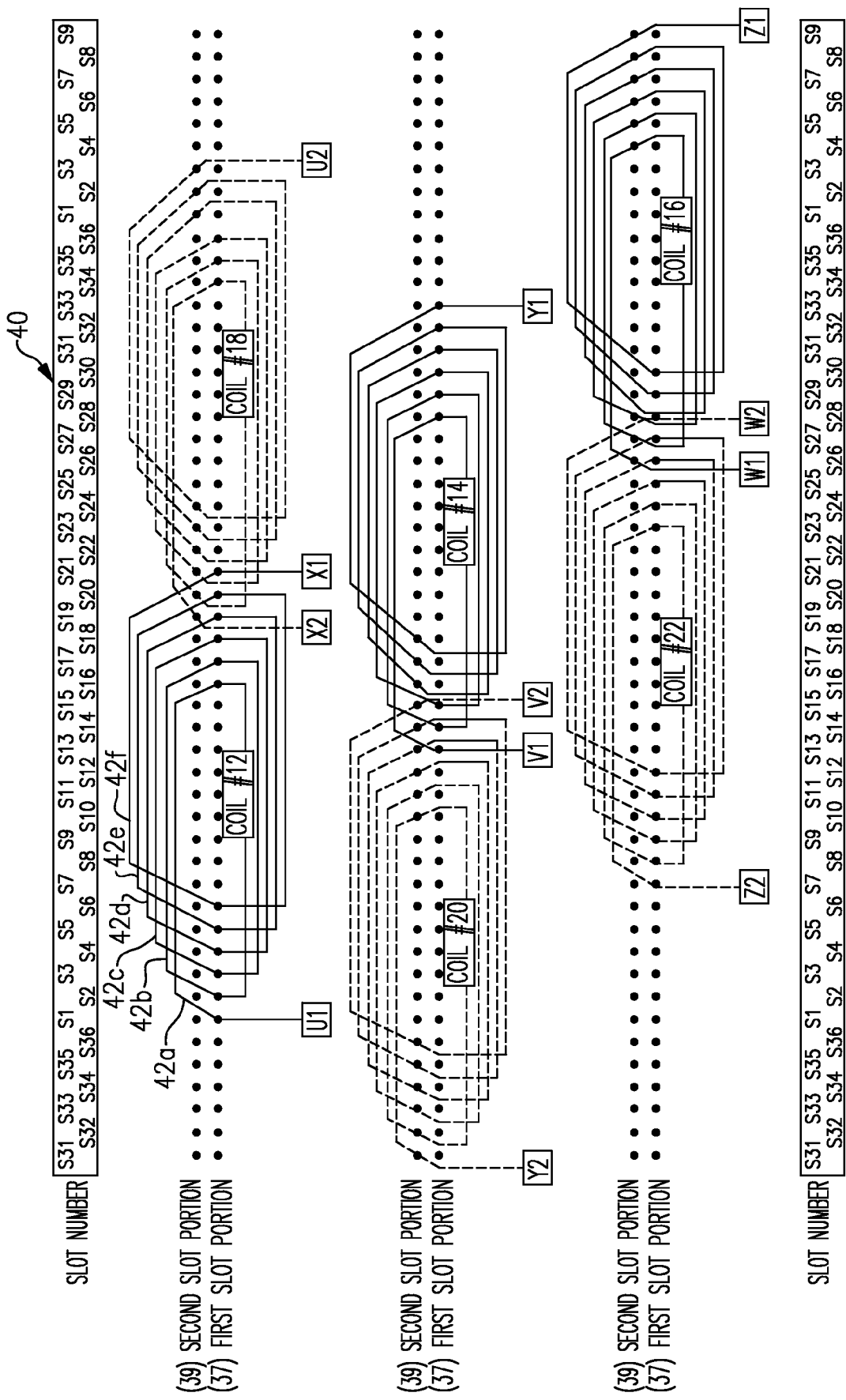
FIG. 3 schematically illustrates a winding scheme to implement the stator circuit of FIG. 1.

FIG. 2 schematically illustrates a cylindrical stator core 30 having a first end 32 and a second end 34. In one example the first end 32 corresponds to a bottom end of the stator core 30 and the second end 34 corresponds to a top end of the stator core 30. A central axis 35 extends axially along a center of the stator core 30. The stator core 30 has a center opening that defines an inner peripheral surface 38. The stator core 30 includes a plurality of slots 36 formed on the inner peripheral surface 38 that extend from the first end 32 to the second end 34 and are parallel to the central axis 35. In one example each of the slots 36 have a first slot portion 37 and a second slot portion 39 (see FIG. 4b), with the first slot portion 37 being closer to an outer peripheral surface 41 of the stator core 30 and the second slot portion 39 being closer to the inner peripheral surface 38 of the stator core 30. Although the stator core 30 of FIG. 2 includes thirty-six slots 36, it is understood that other quantities of slots could be used, and that a geometry of each of the slots may vary. As shown in FIG. 3, the slots 36 are individually numbered S1-S36.

FIG. 3 schematically illustrates an example winding scheme 40 that implements the stator circuit 10 on the stator core 30 using conductive bundles 60 (FIG. 4a-c, 5) that each include a plurality of insulated conductive wires 62 (see FIG. 4a). Using individual insulated conductive wires 62 helps to minimize an undesirable eddy current that can occur when larger wires are used (e.g. if a bundle was formed of a single large wire). The example winding scheme 40 of FIG. 3 places coils 12, 14, and 16 in the first slot portion 37 of a plurality of the slots 36, and places coils 18, 20, and 22 in the second slot portion 39 of a plurality of the slots 36. In one example each of the plurality of insulated conductive wires 62 has an enamel insulating coating. In one example each of the plurality of insulated conductive wires 62 within the conductive bundle 60 are electrically coupled in parallel.

Referring to FIG. 3, and using coil 12 as an example, the coil 12 enters slot S1 at the first end 32 of the stator core 30, exits slot S1 at the second end 34 of the stator core 30, enters slot S16 at the second end 34 of the stator core 30, exits slot S16 at the first end 32 of the stator core 30, and then enters slot S2 at the first end 32 of the stator core to form a first turn in coil section 42a (see FIG. 2). These steps may be repeated so that the coil section 42a includes a plurality of turns. Once coil section 42a is complete, the process is repeated as shown in FIG. 3 to form a plurality of coil sections 42b-f so that the coil 12 has a predetermined quantity of coil sections. Although the winding scheme 40 includes six coil sections (sections 42a-f) for coil 12, it is understood that other quantities of sections could be used. The other coils 14-22 are formed in a similar fashion to have six sections. However, as indicated above, other quantities of sections could also be used. In one example the order of coil formation is 12, 22, 14, 18, 16, 20. However, it is understood that the coils 12-22 could be formed in another order. As shown in FIG. 3, the coils 12, 14, and 16 reside in the first slot portion 37 of a plurality of the slots 36, and the coils 18, 20, 22 reside in the second slot portion 39 of a plurality of the slots 36.

Also, as shown in FIG. 3, some slots, such as slots S19-S21 include portions of multiple coils. To accommodate multiple coils in a single slot, an insulating separation layer 64 may be used (see FIGS. 4a-c). Separation layers 64 may also be used to further insulate coils along the first end 32 and the second end 34 of the stator core 30. In one example each coil section 42a-f includes 1-4 turns, and each slot has a portion of the conductive bundle 60 in the first slot portion 37 and the second slot portion 39, such that each slot 36 includes 2-8 turns.

Figure 6:
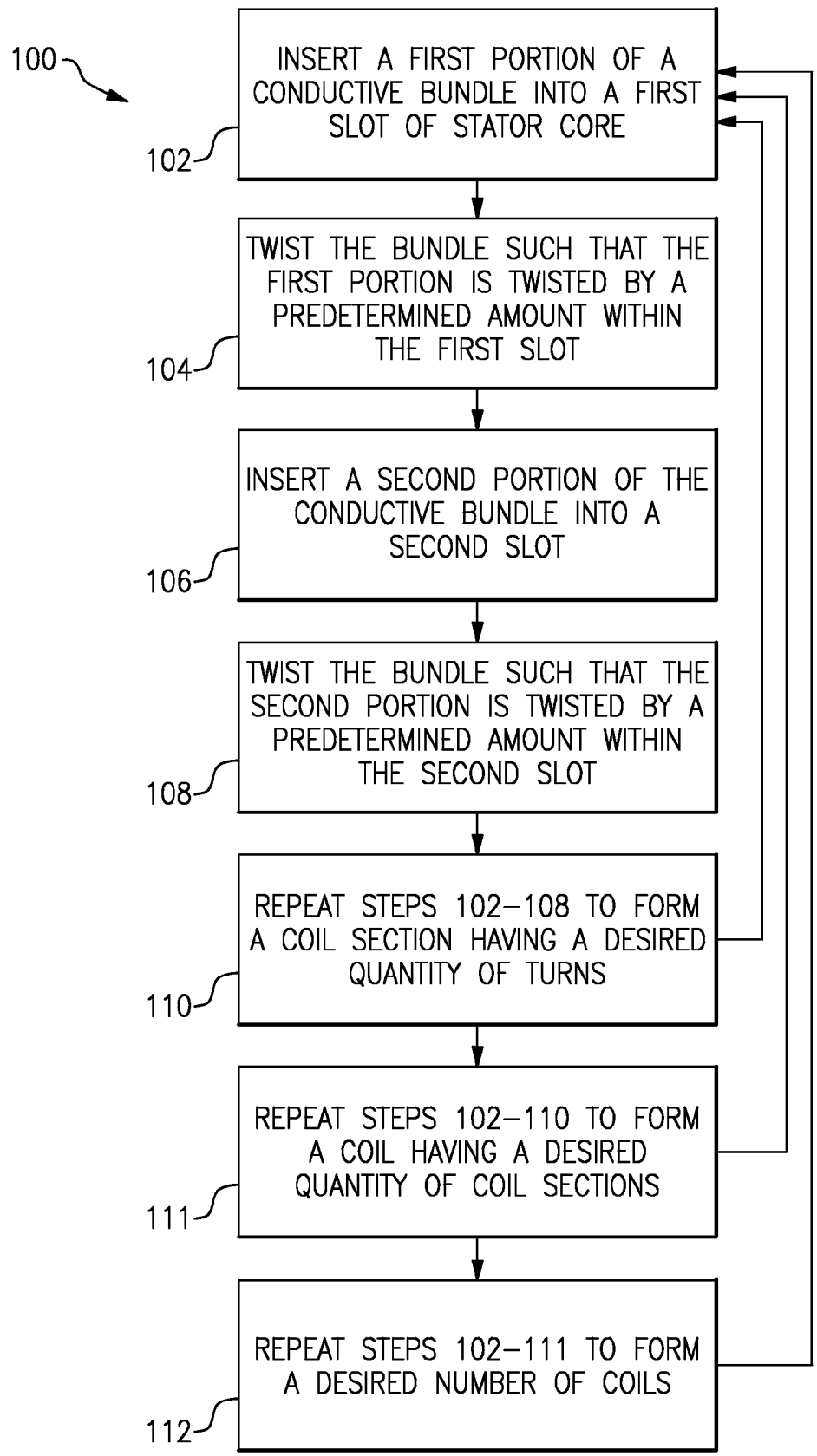
FIG. 6 schematically illustrates a method of forming a stator assembly by inserting a plurality of coils in the stator core of FIG. 2.

FIG. 6 schematically illustrates a method 100 of forming the plurality of coils 12-22 on the stator core 30. A portion 61 (FIG. 2) of a conductive bundle 60 is placed into a first slot 36 of stator core 30 (step 102). The bundle 60 is then twisted such that the portion 61 is twisted by a predetermined amount within the first slot (step 104, FIG. 4c). However, it is understood that the bundle 60 could be twisted by the predetermined amount before being inserted in the slot 36. In one example the predetermined amount is 360 degrees. In one example the predetermined amount is a multiple of 360 degrees. Of course, other predetermined amounts may be used. A second portion 63 (FIG. 2) of the conductive bundle 60 is inserted into another slot (step 106), and the bundle 60 is then twisted such that the second portion 63 is twisted by the predetermined amount (108). The steps 102-108 may then be repeated (step 110) to form a coil section having a desired quantity of turns. Steps 102-110 may then be repeated (step 111) to form a coil having a desired quantity of coil sections. Steps 102-111 may then be repeated (step 112) to form a desired number of coils on the stator core 30.

FIGS. 4a-c schematically illustrate conductive bundles 60a, 60b that each correspond to a single bundle of insulated conductive wires 62 so that the first portion 37 of slot 36a includes a single portion of the bundle 60a and the second portion 39 of slot 36a includes a single portion of the bundle 60b. FIG. 5a illustrates a stator core slot 36b that includes four portions of conductive bundle 60c and four portions of conductive bundle 60d. In the example of FIG. 5a, the bundles 60c, 60d include fewer insulated conductive wires 62 so that the slot 36b can accommodate four turns of each bundle 60c, 60d. Of course, other quantities of turns could be used.

FIG. 5b illustrates a stator core slot 36c that includes a portion of two example Litz wire conductive bundles 66a, 66b. Each of the bundles 66a, 66b includes a plurality of discrete bundles 68 of insulated conductive wires 62. As described above, in step 104 a portion 61 of the conductive bundle 60 is twisted by the predetermined amount (first predetermined amount). In the example of FIG. 5b, each of the discrete bundles 68 are twisted by a second predetermined amount prior to twisting the conductive bundle 66 by the first predetermined amount. In one example the second predetermined amount is 360 degrees. In one example the second predetermined amount is a multiple of 360 degrees. In one example the insulated conductive wires 62 within each of the discrete bundles 68 are electrically coupled in parallel.

Figures 7, 8, 9:
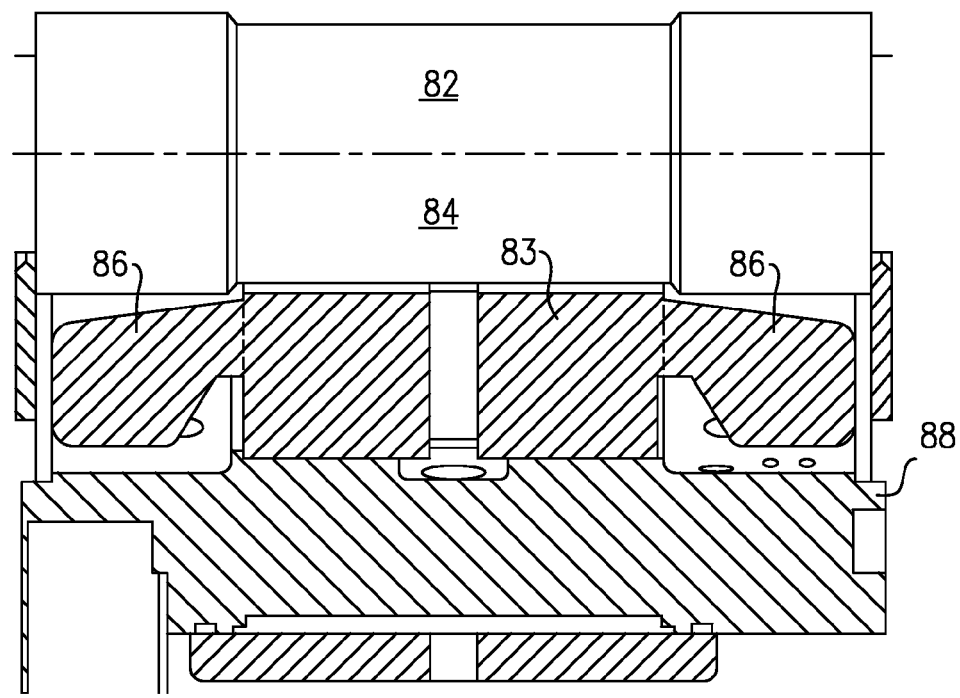
FIG. 7 illustrates an efficiency improvement related to the method of FIG. 6.
FIG. 8 illustrates a circulatory loss coefficient for various phases of electric current at a plurality of frequencies.
FIG. 9 schematically illustrates a compressor electrical motor.

FIG. 7 illustrates an efficiency improvement related to the method of FIG. 6. FIG. 7 includes a table 70 that compares a first conductive bundle 72 formed using the method 100 (see FIG. 4c), a second conductive bundle 74 that is untwisted (see FIG. 4a), and a third conductive bundle 76 that is untwisted but includes twisted discrete bundles (see FIG. 5). As shown in FIG. 7 an average circulatory current loss coefficient 78 is lowest for the bundle 72 formed using the method 100. The circulatory loss coefficient may be determined by the following equation:

$$k_{cc} = N_s \frac{\sum_{n=1}^{N_s} |i_n|^2}{\left|\sum_{n=1}^{N_s} i_n\right|^2} = \frac{P_{cc}}{P_{ed}}$$

equation #1 where $k_{cc}$ is a circulatory loss coefficient;
$N_s$ is the number of parallel strands in a bundle;
$i_n$ is the complex value of a current in strand n;
$P_{cc}$ corresponds to a case in which circulatory current exists; and
$P_{ed}$ corresponds to a case where a sum of current is equally divided between the strands in a bundle.

As a point of comparison, a loss coefficient of 1.0 (where $P_{cc}=P_{ed}$) corresponds to a zero circulatory loss. However, if $P_{cc}>P_{ed}$, then the loss coefficient would be greater than 1.0, indicating a non-zero circulatory loss.

FIG. 8 illustrates a circulatory loss coefficient for various phases of electric current at a plurality of frequencies. Phase U 90 corresponds to coils 12 and 18 connected in parallel, phase V 92 corresponds to coils 14 and 20 connected in parallel, and phase W 94 corresponds to coils 16 and 22 connected in parallel. In this example, each phase has two coils and each coil has 100 conductors or strands in parallel. FIG. 8 also includes an average circulatory loss coefficient 96 for all phases 90-94. As shown in FIG. 8, the circulatory loss coefficient tends to increase as frequency increases.

FIG. 9 schematically illustrates a compressor electrical motor 80 that is one example application for the stator core 30. In one example the motor 80 is operated at a range of 20,000-100,000 rpm, 100-600 kW, and 400-690V. The motor 80 includes a solid steel rotor 82 and a stator core 83 separated by an air gap 84. In one example the stator core 83 includes a plurality of slots formed at least partially by thin laminations that are between 0.2-0.35 mm (0.079-0.0014 inches) thick. In one example the air gap 84 is 1-4 mm (0.04-0.16 inches) thick. A plurality of windings 86 form coils on the stator core 82. These coils can be any of those discussed above, and may correspond to the conductive bundles 60, 66 as shown in FIGS. 4a-c and FIG. 5. A housing 88 houses the rotor 82, stator core 83, and windings 86. It is understood that the motor 80 could also be configured to operate as a generator, and could therefore be considered an electric machine.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:
1. A stator assembly, comprising:
a stator core having a first end, a second end, and a plurality of slots extending from the first end to the second end, wherein each of the plurality of slots includes an outer slot portion that is closer to an outer peripheral surface of the stator core and an inner slot portion that is closer to an inner peripheral surface of the stator core;

a plurality of conductive bundles each including a plurality of individually insulated conductive wires, the bundles being wrapped around the stator core in a plurality of turns that extend between the first end and the second end of the stator core, portions of the plurality of conductive bundles being placed into the plurality of slots, the bundle portions being twisted by a predetermined amount within the slots to minimize a circulatory current between the individually insulated conductive wires; and wherein the conductive bundles are arranged into pairs in a double star configuration, each pair of conductive bundles including a first conductive bundle and a second conductive bundle connected in parallel, each pair of conductive bundles corresponding to a phase of alternating current produced by the stator assembly, and wherein selected slots of the stator core include a portion of the first bundle of a selected pair in one of the inner or outer slot portion and include a portion of the second bundle of the selected the pair in the other of the inner or outer slot portion with the bundle portions being separated by an insulating separation layer within the slot.

2. The stator assembly of claim 1, wherein each conductive bundle comprises twelve portions that are placed in twelve different slots and are each twisted by the predetermined amount within each of the twelve slots to form a coil having six coil sections.

3. The stator assembly of claim 2, wherein each conductive bundle includes two, three, or four turns of the conductive bundle.

4. The stator assembly of claim 1, wherein the predetermined amount is at least 360 degrees.

5. The stator assembly of claim 1, wherein each of the conductive bundles corresponds to a single bundle of individual insulated conductive wires.

6. The stator assembly of claim 1, wherein each of the conductive bundles includes a plurality of discrete bundles of individual insulated conductive wires, with each discrete bundle being individually twisted prior to the portion of the at least one conductive bundle being twisted by the predetermined amount.

7. The stator assembly of claim 1, wherein the stator core is cylindrical and wherein the slots extend along an inner peripheral surface of the stator core and are parallel to a central axis of the stator core.

8. The stator assembly of claim 1, wherein each of the plurality of individual insulated conductive wires has an enamel insulating coating.

9. The stator assembly of claim 1, wherein the stator assembly is associated with an electric machine that is operable to produce a voltage having a range of 400-690 volts and to yield power having a range of 100-600 kilowatts, the electric machine having a rotor that rotates between 20,000-100,000 revolutions per minute.

10. A method of forming a stator assembly, comprising:
A) grouping a plurality of individual insulated conductive wires into a conductive bundle;
B) placing a portion of the conductive bundle in a stator core slot extending from a first end of a stator core to a second end of the stator core;
C) twisting the bundle such that the portion is twisted by a predetermined amount within the stator core slot to minimize a circulatory current along the plurality of individual insulated conductive wires in the portion;
D) selectively repeating steps A-C for a plurality of conductive bundles to form a plurality of coils having a desired quantity of turns, wherein selected slots include portions of two of the conductive bundles separated by an insulating separation layer;
E) grouping the plurality of conductive bundles into pairs of bundles, each pair including two bundles connected in parallel; and
F) arranging the pairs of bundles into a double star formation.

11. The method of claim 10, wherein said step of grouping a plurality of individual insulated conductive wires into a conductive bundle includes grouping the plurality of individual insulated conductive wires into a single bundle.

12. The method of claim 10, wherein said step of grouping a plurality of individual insulated conductive wires into a conductive bundle comprises:
twisting a first plurality of individual insulated conductive wires to form a first discrete conductive bundle;
twisting a second plurality of individual insulated conductive wires to form a second discrete conductive bundle;
twisting a third plurality of individual insulated conductive wires to form a third discrete conductive bundle; and
grouping the first discrete conductive bundle, the second discrete conductive bundle, and the third discrete conductive bundle together to provide a combined conductive bundle.

13. The method of claim 10, wherein said step of placing a portion of the conductive bundle in a stator core slot extending axially from a first end of a stator core to a second end of the stator core comprises:
inserting a first portion of the conductive bundle into a first stator core slot;
twisting the conductive bundle such that the first portion is twisted by the predetermined amount within the first stator core slot;
inserting a second portion of the conductive bundle into a second stator core slot; and
twisting the conductive bundle such that the second portion is twisted by the predetermined amount within the second stator core slot.

* * * * *